Patented May 28, 1929.

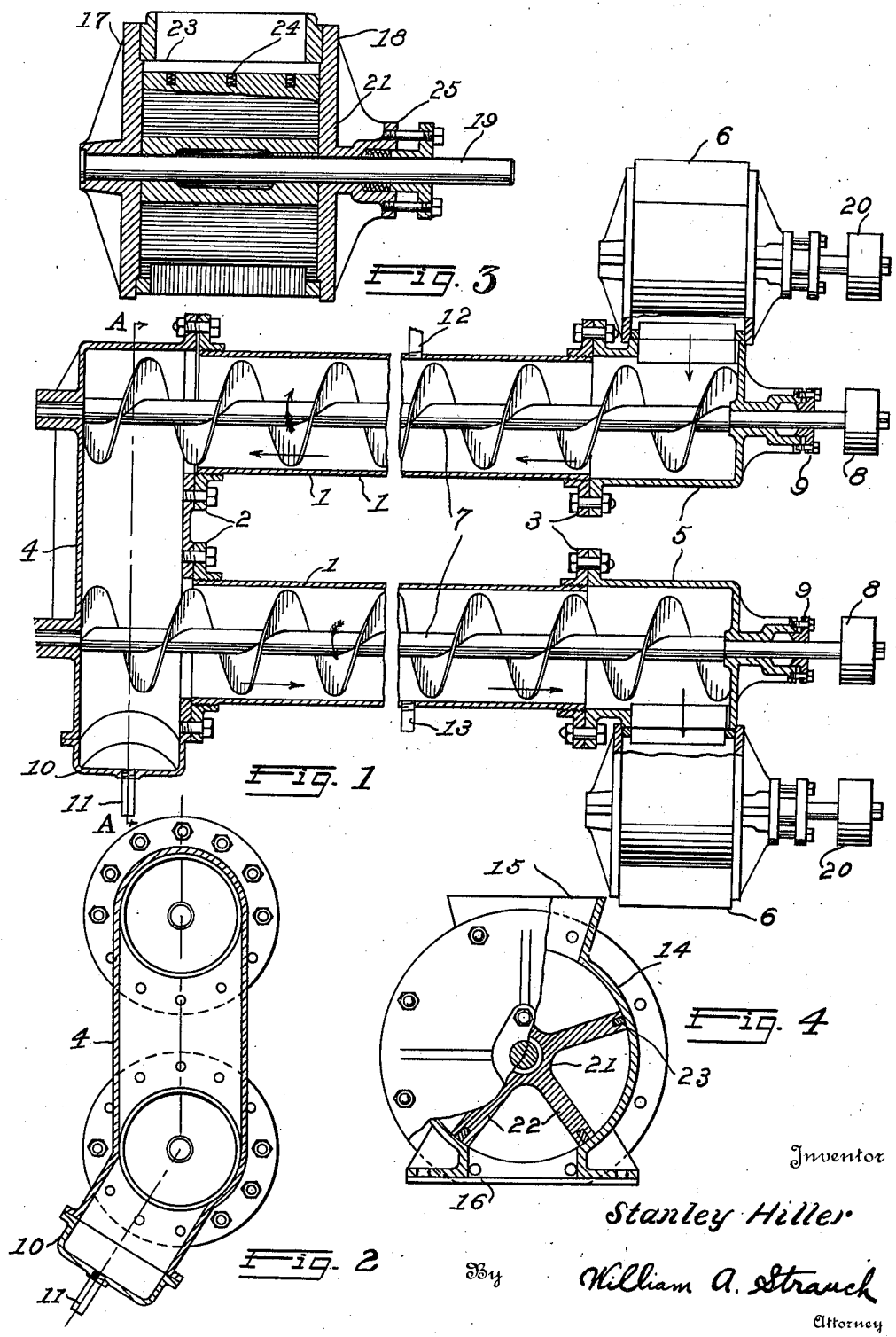
May 28, 1929.  S. HILLER  1,715,065
APPARATUS FOR COOKING MATERIALS
Filed April 5, 1923

1,715,065

UNITED STATES PATENT OFFICE.

STANLEY HILLER, OF SAN JOSE, CALIFORNIA, ASSIGNOR TO STANLEY HILLER, INC., OF SAN FRANCISCO, CALIFORNIA.

APPARATUS FOR COOKING MATERIALS.

Application filed April 5, 1923. Serial No. 630,041.

This invention relates to an apparatus for cooking materials thoroughly and at a pressure above or below that of the atmosphere, while maintaining a continuous movement of the materials through the apparatus.

More particularly the invention relates to a continuous apparatus for cooking fish, fish waste, seeds, garbage, vegetables and the like materials under pressure.

The objects of the invention are to provide a pressure cooker to which the materials are fed continuously and from which the materials are discharged continuously, while maintaining the desired cooking pressure in the cooker; to provide a continuous process of cooking materials under pressure; to provide a feeding cooking discharging apparatus in which foreign substances are collected in a manner to prevent injury thereby to other apparatus used in connection with the cooker; and such other objects as may be attained in the preferred embodiment herein described.

The preferred embodiment herein disclosed is particularly useful in a plant for manufacturing fish meal such as is shown in Patent No. 1,489,940 issued April 8, 1924.

Referring to the drawings:

Figure 1 is an elevation, partially in section showing the cooker proper and the valves.

Figure 2 is a sectional view taken along line AA of Figure 1.

Figure 3 is a sectional elevation showing the valve structure.

Figure 4 is an end elevation partially in section of the valve.

The body portion of the cooker comprises cast sections 1 to which are secured flanges 2 and 3. Bolted to flanges 2, is an end piece 4 which forms a connection through which material passes from the upper to the lower section 1 of the cooker. Secured to flanges 3 are end pieces 5. Valves 6 are bolted to end pieces 5. Journaled in bearings formed in end pieces 4 and 5 are feed screws 7. Provision is made for rotating screws 7, through drive pulleys 8 or in any well known manner. Stuffing boxes 9 are provided to maintain pressure tight driving journals.

End piece 4 is provided with a recessed section or sump (Fig. 2) to which is secured a removable cap or bottom piece 10. A drain pipe 11 is provided to draw off liquid that may accumulate in the sump. Pipes 12 and 13 are provided for the admission and exhaust of steam from the cooker.

Valves 6 comprise a body portion 14 with openings 15 and 16. To 14 are secured end pieces 17 and 18. Journaled in 17 and 18 is a spindle 19 provided with driving pulley 20. Rigidly secured to 19 is a valve or star wheel 21 with a plurality of vanes 22. In slots in each vane, a packing member 23 is set. Packing members 23 are pressed outwardly against 14 by springs 24 to form a steam tight valve joint. The vanes are so arranged that there will always be two members 23 in each valve sealing the cooker to maintain pressure therein. Each valve is provided with a common form of stuffing box 25. Check valves may be provided in pipes 11, 12 and 13 to maintain any desired pressure in the cooker.

Operation.

In operation steam under pressure is admitted to the interior of cooker, and the material to be treated is fed into the hopper of the upper or feed valve 6. The star wheel is continuously rotated by suitable driving means and feeds the material in obvious manner to the upper screw 7. The material is then fed along the upper section in the direction of the arrows until it passes into section 4, and then drops to lower screw 7 and is again fed along until it passes into the lower or discharge valve 6. The discharge valve is continuously rotated to remove the completely cooked material from the cooker without permitting the lowering of pressure in the cooker.

As the material falls by gravity through 4, heavy foreign substances such as tools, for example, which have been carelessly dropped into the material, fall to the bottom of the sump where they may be collected. In this manner serious injury to presses to which the material is fed, is averted and no harm is done thereby to the cooker or feed valve.

The speeds of the valves and conveyor screws are controlled so that the material is cooked to the proper degree while continuously moving through the cooker.

Having described a preferred embodiment of my invention, what is desired to be secured by Letters Patent and is claimed as new is:

1. A continuous cooker comprising in combination a body in which pressures substantially different from atmospheric pressure may be continuously maintained; conveying means in said body for continuously passing materials to be cooked therethrough; a continuously operable feed valve provided with a plurality of separate compartments adapted to feed materials continuously to said conveying means and to maintain a continuous pressure seal independently of the materials passing therethrough; and a continuously operable discharge valve provided with a plurality of separate compartments adapted to receive materials from said conveying means and to pass the same out of said cooker body while maintaining a pressure seal independently of the materials passing therethrough.

2. A continuous cooker comprising a cylindrical body section in which a cooking atmosphere at a pressure substantially above atmospheric pressure may be continuously maintained; a screw conveyor extending through said body section and adapted to convey materials continuously therethrough in direct contact with and exposed to the pressure cooking atmosphere; a continuously operable feed valve provided with a plurality of separate compartments adapted to feed materials continuously to said screw conveyor and to maintain a continuous pressure seal for said cooker body independently of the materials passing therethrough; and a valve to which the materials are delivered by said screw conveyor adapted to continuously discharge the materials from said cooker body while maintaining a pressure seal for said cooker body independently of the materials passing therethrough.

STANLEY HILLER.